United States Patent [19]

Carlson

[11] Patent Number: 5,022,091
[45] Date of Patent: Jun. 4, 1991

[54] IMAGE PROCESSING TECHNIQUE

[75] Inventor: Robert C. Carlson, Los Angeles, Calif.

[73] Assignee: Hughes Aircraft Company, Los Angeles, Calif.

[21] Appl. No.: 486,330

[22] Filed: Feb. 28, 1990

[51] Int. Cl.$^5$ .............................................. G06K 9/36
[52] U.S. Cl. ....................................... 382/49; 382/56
[58] Field of Search .................... 382/41, 49, 54, 22, 382/56; 358/445, 433

[56] References Cited

U.S. PATENT DOCUMENTS

| | | | |
|---|---|---|---|
| 4,698,843 | 10/1987 | Burt et al. | 382/49 |
| 4,764,975 | 8/1988 | Inoue | 382/56 |
| 4,783,832 | 11/1988 | Kaneko | 382/41 |
| 4,827,533 | 5/1989 | Tanaka | 382/54 |
| 4,831,659 | 5/1989 | Miyaoka et al. | 382/56 |

Primary Examiner—Leo H. Boudreau
Assistant Examiner—David Fox
Attorney, Agent, or Firm—Leonard A. Alkvo; Wanda K. Denson-Low

[57] ABSTRACT

A novel method of image filtering to enhance the appearance of imagery, particularly synthetic aperture radar imagery. The invention uses detected edges to adaptively control the bandwidth of filters used for noise suppression. The technique of the present invention offers improved noise suppression while minimizing the loss of resolution due to filtering.

31 Claims, 2 Drawing Sheets

FIG. 4
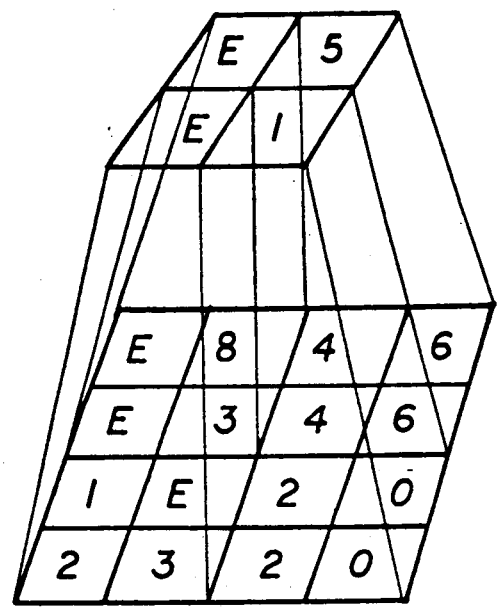
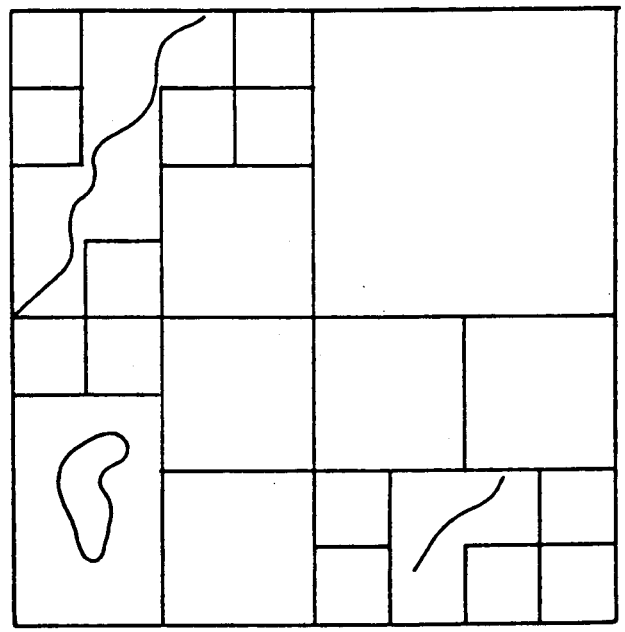
FIG. 5

IMAGE PROCESSING TECHNIQUE

BACKGROUND OF THE INVENTION

1. Field of the Invention

The present invention relates to image processing techniques. More specifically, the present invention relates to techniques for suppressing noise in synthetic aperture radar (SAR) imagery.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Numerous technologies are currently employed to produce images from signals received by electromagnetic, electro-optical, and other sensors. Images are constructed from discrete sensor samples which are susceptible to noise. Accordingly, quality of the constructed image is often adversely affected. Noise has the effect of impeding the recognition of features by interpreters having little experience or expertise.

Prior attempts to improve the noise quality of the image have typically involved a filtering of the image data or the formation of multiple images and the performance of noncoherent integration. Each approach has certain shortcomings. In digital filtering algorithms, for example, each pixel in the image is replaced by a value which represents the average of the values of neighboring pixels. While such techniques have heretofore been somewhat effective in reducing noise, such improvement has typically come at the expense of the resolution of the image. That is, filters have been found to diminish the edge information necessary to produce sharp images. As a result, edges in filtered images tend to appear smooth.

The formation of multiple images and the performance of noncoherent integration tends to slow the operation of the system and may adversely affect system timelines.

Accordingly, there is an ongoing need in the art for techniques for suppressing noise in sensor generated images which do not require a sacrifice in image resolution. There is a particular need in the art to reduce speckle noise associated with the generation of SAR images. (Speckle noise is noise which appears as speckles in an output image.)

In "Geometric Filter for Speckle Reduction", by Thomas R. Crimmins, *Applied Optics*. Vol. 24, pages 1438-1443, May 15, 1985, a nonlinear algorithm is disclosed for reduction of speckle noise in SAR imagery. There are several apparent shortcomings with the Crimmins algorithm.

A first shortcoming derives from the fact that the algorithm is an iterative technique. The number of iterations required to achieve the desired performance is not known until the results are observed.

A second shortcoming derives from the fact that the Crimmins technique is nonlinear. Prediction of the performance of such nonlinear filters is problematic and the results are not necessarily reliable or repeatable when the image is changed slightly.

A third shortcoming derives from the fact that the Crimmins technique does not appear to preserve edge or other target data. Rather, it works by reducing speckle noise faster than it corrupts target data, see page 1442.

Finally, the Crimmins technique does not appear to be readily adaptable to other situations.

Thus, there is a further need in the art for an improved noniterative, content adaptive, linear speckle noise reduction technique that preserves edge or other target data and which is readily adaptable to diverse situations.

SUMMARY OF THE INVENTION

The need in the art is addressed by the present invention which provides an improved image processing technique. In accordance with the present invention, a first array of pixels is created corresponding to an input image with each pixel having an address and a data value. A second array of data values is created at addresses corresponding to the location of edges in the image. The first array is set as a base level for a data pyramid and modified with the second array to create a modified base level. In the modified base level, each location is changed to contain an edge marker if an edge marker is present in a corresponding location of the second array. Otherwise, each location contains data from the first array in a corresponding location.

Next, the pyramid is filled one level at a time from the bottom to the top thereof, by creating additional arrays of data values. Each additional array provides an additional level in the pyramid. Each pixel in each level is either marked as an edge, if any of a predetermined number of associated pixels in the adjacent lower level is marked as an edge. Otherwise, each pixel in each level is filled with a data value equal to some linear function of the associated pixels in the adjacent lower level.

Next, the base level of the pyramid is replaced with the first array of pixels. And, starting at a level above the base level, at each pixel location that is not marked as an edge, the corresponding pixel locations in the adjacent lower level are filled with the value of the pixel in the adjacent upper level until the first array at the base level is modified accordingly to provide an improved output image.

The technique of the present invention offers improved noise suppression in SAR imagery while minimizing the loss of resolution due to filtering.

In a specific embodiment, a technique is disclosed which affords an improved noniterative, content adaptive, linear speckle noise reduction technique for SAR images that preserves edge or other target data which is readily adaptable to diverse situations.

BRIEF DESCRIPTION OF THE DRAWINGS

FIG. 4 illustrates the push up step operation of the method of the present invention.

FIG. 5 shows a sample block decomposition of an image filtered by the method of the present invention.

DESCRIPTION OF THE INVENTION

Illustrative embodiments and exemplary applications will now be described with reference to the accompanying drawings to disclose the advantageous teachings of the present invention.

Figure 1:
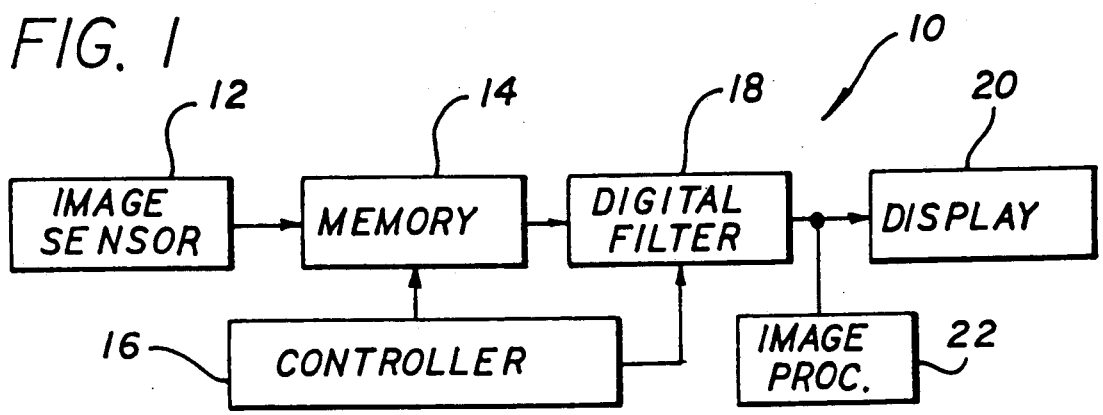
FIG. 1 is an illustrative block diagram of the imaging system of the present invention.

FIG. 1 is an illustrative block diagram of the imaging system 10 of the present invention. The system 10 includes an image sensor 12 which may be a synthetic aperture radar antenna, an infrared antenna or other sensing device. The output of the image sensor 12 is stored in a memory 14 under the control of a controller or microprocessor 16. The data stored in the memory 14 is filtered by a digital filter 18. The filter 18 may be implemented by a program running in the controller 16. The output of the filter 18 is image data filtered for noise reduction. The output of the filter 18 is displayed by a conventional display 20 or processed for by a conventional image processor 22. In the preferred embodiment, the method of the present invention is implemented as a program within the controller 16.

Pyramid Data Structure and Feature Detection

Figure 2:
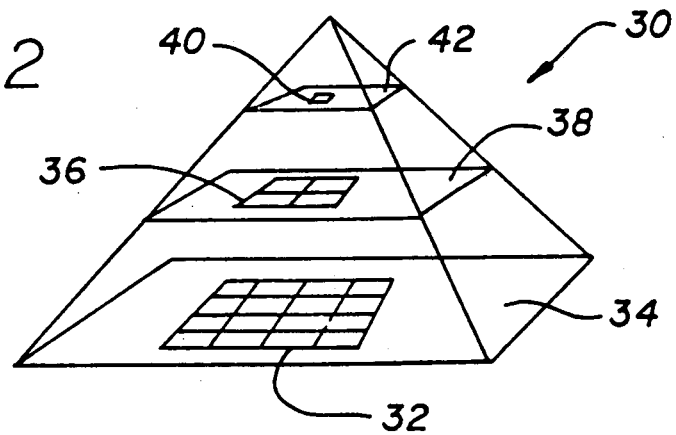
FIG. 2 shows an image pyramid which is useful for illustrating the operation of the present invention.

Images often contain objects of a wide variety of sizes and textures. In analyzing an image it is useful to work at various resolutions depending on the size of objects being considered. A pyramid data structure is one method for simultaneously representing image data at a variety of resolutions. In a pyramid data structure, a series of successively coarser resolution images are stacked on top of an original image, forming a pyramid 30 as illustrated in FIG. 2. The top of the pyramid is regarded as level 0 and the lower levels are numbered consecutively.

Figure 3:
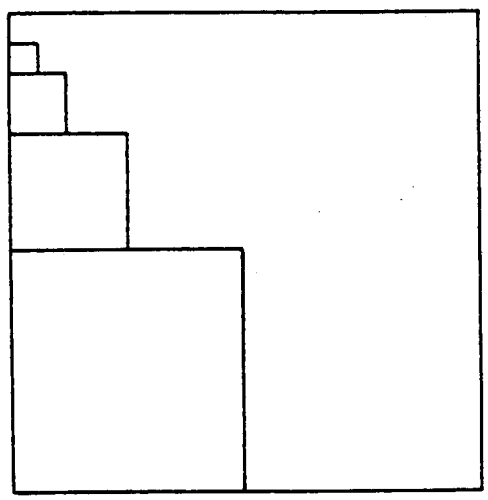
FIG. 3 shows a square array for storing the pyramid of FIG. 2.

For convenience of implementation, the images in the present invention are assumed to be square with side lengths equal to a power of 2. If the original image size is $2^N$ and the original image 32 is at the base 34 of the pyramid 30, the pyramid would have N+1 levels indexed by the log base 2 of the side length and there would be an image 40 consisting of 1 pixel at the peak 42 of thereof. Each level 38 of the pyramid 30 consists of an image 36 having a side length equal to half of that of the level below. Such a pyramid 30 can be stored within a square array as illustrated in FIG. 3.

In the illustrative embodiment, it is convenient to regard each pixel (i,j) (where 'i' is the row and 'j' is the column of the pixel in the image) on level n as being directly above pixels (2i,2j), (2i+1,2j), (2i,2j+1), (2i+1,2j+1) of level n+1. Conversely is convenient to regard these four pixels as being directly below pixel (i,j) of level n. This relation extends by transitivity to a partial ordering on the whole pyramid, forming a tree with the top of the pyramid being the root of the tree.

A very simple example, using the pyramid data structure, is based on naive resampling. Starting at the base 34, one moves from level n to level n−1 by sampling every fourth pixel. A convenient choice is the set of pixels having coordinates at level n which are even numbers. If low pass filtering precedes the resampling, a more useful multiresolution representation of the image is obtained. Some authors have termed this pyramid of filtered and resampled images the 'Gaussian pyramid', "Notes for a SIAM Short Course on Computer Vision (at Harvard Robotics Laboratory)", by R. Brockett et al., (1986); "The Laplacian Pyramid as a Compact Image Code" by P. Burt and E. Adelson, in *Readings in Computer Vision*, (1982); and "Hierarchical Warp Stereo", by L. Quam, in *Readings in Computer Vision*, (1984).

Analysis of related multiresolution data has also played a role in analysis of edge detections. The work of Marr and Hildreth in *Vision* (1982), emphasized interpretation of edges using a variety of filters matched to different scales. Following this work, investigators have replaced the multibandwidth low pass filters with multibandwidth edge detectors. The term 'scale space' in the Brockett et al paper, cited above, is often used in this context to describe the simultaneous multiresolution representation of image data.

In accordance with the present invention, useful information is extracted by merging two images into a single pyramid. That is, image filtering, as in the Gaussian pyramid, is combined with the results from an edge detection algorithm to produce output images which are edge adaptive linear functions of the input image. That is, if the detected edges are fixed, the filtering is a fixed linear filter, but if the detected edges change, the linear filtering will generally change. Thus in general, the filtering is not a linear function of the input image.

P-Filtering

The following discussion provides an implementation of the content adaptive filtering scheme of the present invention. This scheme will be referred to as p-filtering due to the close connection with the pyramid data structure. In accordance with the present teachings, a first array of pixels Im(i,j) is created corresponding to an input image with each pixel having an address and a data value, where i and j are the usual pixel indices. A second array of data values E(i,j) is created at addresses corresponding to the location of edges in the input image. The edge array E(i,j) is binary in that each location is marked to indicate whether or not it is occupied by an edge. In the illustrative embodiment, the edge detection algorithm employed begins with a filtered gradient. Threshold crossings which are also local maxima in the direction of the gradient are saved, yielding edges which are approximately 1 pixel wide.

Thus, in accordance with the present teachings, the first array Im(i,j) is set as the array 32 of the base level 34 for the data pyramid 30 and modified with the second array E(i,j) of edge data to create a modified base level. In the modified base level, each location is changed to contain an edge marker 'E' if an edge marker is present in a corresponding location of the second array. Otherwise, each location contains data from the first array in a corresponding location.

Push Up Step: Next, the pyramid 30 is filled one level at a time from the bottom to the top thereof, by creating additional arrays of data values. Each additional array provides an additional level in the pyramid. Each pixel in each level is either marked as an edge, if any of a predetermined number of associated pixels in the adjacent lower level is marked as an edge. Otherwise, each pixel in each level is filled with a data value equal to some function of the associated pixels in the adjacent lower level. For example, assume that level n+1 is filled in. Consider a pixel (i,j) in level n and the four pixels directly below in level n+1. If any of the four pixels is marked as an edge, the (i,j) pixel in level n is marked as an edge. Otherwise, pixel (i,j) of level n is filled with the mean of the four associated pixels in the adjacent lower level. This push up step operation is illustrated in FIG. 4.

Push Down Step: Next, the array 32 at the base level 34 of the pyramid 30 is replaced with the input image array Im(i,j) of pixels. Starting at a level above the base level 34, at each pixel location that is not marked as an edge, the corresponding pixel locations in the adjacent lower level are filled with the value of the pixel in the adjacent upper level until the first array at the base level is modified accordingly. Thus, filtered image data is pushed down through the pyramid 30 to provide an improved output image.

To facilitate an understanding of the effect of this (block) version of p-filtering, consider the following. At the k-th level of the pyramid, there is an implicit decomposition of the base image into $(2^k) \times (2^k)$ blocks, these blocks being the pixels in the base below a pixel at level k. For each pixel in the base, the largest block is identified which contains the pixel, but which does not contain any edge pixel. The block p-filtered image value of a pixel is the average of all the pixels in the original image which are contained in this block. A sample block decomposition is shown in FIG. 5.

In accordance with the method of the present invention, narrowband filtering is implemented by starting at the top of the pyramid 30. Wideband filtering is implemented by starting at a level lower than the top level. Wideband filtering may be utilized when it is desired that medium scale features not be suppressed because of excessive filtering. The effect of starting at a level lower than that of the top level is to put a bound on the size of the blocks over which averages are computed. In filter bandwidth terminology, a minimum is placed on the filter bandwidths.

A problem with simple p-filtering is that the resulting image is may appear to be 'blocky'. That is, the replacement of pixels by blocks is apparent in the output image. This problem may be addressed by modifying the push down step. After pushing down pixel data from level n−1 to level n, make a copy of level n, and a copy of the level n image consisting of edge pixels only. Next, filter both copies using convolution with a mask, e.g., a 3×3 mask, with uniform weights. If a pixel in the filtered edge image has the value zero, replace the original value in the level n pixel with the value in the filtered copy. Otherwise, do nothing. This process removes visible signs of blocks in the p-filtered image.

Speckle Reduction:

There has been a persistent interest in the development of image processing techniques which reduce speckle in SAR imagery. The major problem is that speckle distracts interpreters with little SAR experience. Since many potential users of SAR imagery may only view the data occasionally, there is incentive to modify the appearance of the image so that it looks more like a conventional photograph. Speckle reduction is implemented by use of wideband p-filtering coupled with the use of a filter mask in the push down step as discussed above. (In the illustrative embodiment, the push down step is initiated at level N−4.)

If more texture is desired, the filtered image may be averaged with the original unfiltered image. Since edge data is not filtered, resolution is preserved.

Unfortunately, the process of edge detection can result in the elimination of small edges associated with point-like targets, which may be significant features requiring preservation. For some applications, particularly speckle reduction, for the improvement of image appearance, a distinct point target detector may be desirable. In such an application, reliably detected point targets can simply be added to the collection of pixels marked as edges, thus modifying the selection of image content upon which the content adaptive linear filtering is based.

Shading Estimation:

In regions of constant reflectivity, changes in image brightness are caused by changes in surface orientation. Although there may be some theories as to how to obtain shape from shading, typical SAR images contain regions with a variety of reflectivities. P-filtering provides an effective means to recognize and estimate shading in a complex scene. The estimate can then be used to either estimate shape, or to remove the shading so that errors in brightness segmentation are reduced.

The estimate of shading is computed in an extremely straightforward manner. One wideband and one narrowband p-filter is employed, forming two filtered images A and B, respectively. (For the wideband p-filtering, in the illustrative embodiment, the push down step begins at level N−3.) The shading estimate is simply the difference between A and B.

Brightness Segmentation:

P-filtering offers two improvements in brightness segmentation. The first is the shading removal discussed above. Without shading removal, an image can show anomalous brightness segmentation when a slow change in region brightness occurs without triggering edge detections. Shading removal uniformized the brightness in regions bounded (not necessarily completely) by edges.

However, residual problems can still remain if shading removal resulting in a region being assigned a relatively dark or bright intensity. For instance, a region of gray fading slowly to black will be replaced, after shading removal, with a region of dark gray. Since global thresholds are being used for brightness segmentation, black false alarms can still occur in this region.

This last difficulty can be addressed by a final compensation. After shading removal, a narrowband p-filtered image is produced. This image is compared with nominal brightness levels based on the global brightness thresholds. On a pixel-by-pixel basis, the difference between the p-filtered image and the nearest nominal brightness is computed. This correction, along with shading removal, is added to the image if the p-filtered image registers either black or gray. Otherwise the final compensation is omitted.

The technique of the present invention offers improved noise suppression in SAR imagery while minimizing the loss of resolution due to filtering. The technique of the present invention is not iterative. The number of computation steps depends on the image size only. In addition, the technique of the present invention computes a content adaptive linear function of the image data after the edge data is determined.

Thus, the present invention has been described herein with reference to a particular embodiment for a particular application. Those having ordinary skill in the art and access to the present teachings will recognize additional modifications applications and embodiments within the scope thereof. For example, the push up step may be varied to yield blocks having a diameter comparable to the distance to the nearest edge. That is, instead of marking pixels at level n when one of the four associated pixels in the adjacent lower level contains an edge, a pixel is marked at level n when the block in the base of the pyramid has a diameter exceeding the distance from the block to the nearest edge. This decomposition of an open subset of the plane (Euclidean space) is a standard mathematical procedure, (see "Singular Integrals and Differentiability Properties of Functions", by E. Stein, p. 167 (1970)) and was apparently introduced by H. Whitney not later than 1934.

It is therefore intended by the appended claims to cover any and all such applications, modifications and embodiments within the scope of the present invention.

Accordingly,

What is claimed is:

1. An image processing system comprising:
    first means for creating a first array of pixels corresponding to an input image, each pixel having an address and a data value;
    second means for creating a second array of data values at addresses corresponding to the location of features in said image;
    third means for setting said first array as a base level for a data pyramid;
    fourth means for modifying said first array at said base level with said second array to create a modified base level in which each location is modified to contain a feature marker if a feature marker is present in a corresponding location of said second array, otherwise, each location contains data from said first array in a corresponding location;
    fifth means for filling in the pyramid one level at a time, from the bottom to the top thereof, by creating additional arrays of data values, each additional array providing an additional level in said pyramid, each pixel in each level being either marked as a feature, if any of a predetermined number of associated pixels in the adjacent lower level is marked as a feature, or filled with a data value equal to some function of said associated pixels in said adjacent lower level;
    sixth means for replacing the base level of said pyramid with said first array of pixels; and
    seventh means for filling the corresponding pixel locations in the adjacent lower level with the value of said pixel in said adjacent upper level, starting at a level above said base level, at each pixel location that is not marked as a feature, until said first array at said base level is modified accordingly to provide an improved output image.

2. An improved image processing technique including the steps of:
    (a) creating a first array of pixels corresponding to an input image, each pixel having an address and a data value;
    (b) creating a second array of data values at addresses corresponding to the location of features in said image;
    (c) setting said first array as a base level for a data pyramid;
    (d) modifying said first array at said base level with said second array to create a modified base level in which each location is modified to contain a feature marker if a feature marker is present in a corresponding location of said second array, otherwise, each location contains data from said first array in a corresponding location;
    (e) filling in the pyramid one level at a time, from the bottom to the top thereof, by creating additional arrays of data values, each additional array providing an additional level in said pyramid, each pixel in each level being either marked as a feature, if any of a predetermined number of associated pixels in the adjacent lower level is marked as a feature, or filled with a data value equal to some function of said associated pixels in said adjacent lower level;
    (f) replacing the base level of said pyramid with said first array of pixels; and
    (g) starting at a level above said base level, at each pixel location that is not marked as a feature, filling the corresponding pixel locations in the adjacent lower level with the value of said pixel in said adjacent upper level until said first array at said base level is modified accordingly to provide an improved output image.

3. The invention of claim 2 wherein said predetermined number of associated pixels is four.

4. The invention of claim 2 wherein said predetermined function is an averaging function.

5. The invention of claim 2 wherein said step of starting at a level above said base level includes the step of starting at the top of said pyramid.

6. The invention of claim 2 further including the following steps:
    (h) creating a first copy of an array at a given level;
    (i) making a second copy of said array at a given level consisting only of data values at addresses corresponding to the location of features in said array at a given level;
    (j) filtering said first and second copies;
    (k) at each corresponding location, replacing the original value in said array at a given level with the value in the filtered first copy if a pixel in the filtered second copy has a predetermined value.

7. The invention of claim 6 wherein said filtering step (j) includes the step of convolving the data values in each of said copies.

8. The invention of claim 7 wherein said convolving step includes the step of convolving with a $3 \times 3$ pixel mask.

9. The invention of claim 8 wherein said $3 \times 3$ mask has uniform weights.

10. The invention of claim 6 wherein said predetermined value in step (k) is zero.

11. The invention of claim 2 wherein the step (b) includes the step of processing the detections of a point target detector as a feature in the input image.

12. The invention of claim 2 including the step of averaging the output image with the input image.

13. An improved image processing technique including the steps of:
    (a) creating a first array of pixels corresponding to an input image, each pixel having an address and a data value;
    (b) creating a second array of data values at addresses corresponding to the location of edges in said image;
    (c) setting said first array as a base level for a data pyramid;
    (d) modifying said first array at said base level with said second array to create a modified base level in which each location is modified to contain an edge marker if an edge marker is present in a corresponding location of said second array, otherwise, each location contains data from said first array in a corresponding location;
    (e) filling in the pyramid one level at a time, from the bottom to the top thereof, by creating additional arrays of data values, each additional array providing an additional level in said pyramid, each pixel in each level being either marked as an edge, if any of a predetermined number of associated pixels in the adjacent lower level is marked as an edge, or filled with a data value equal to some function of said associated pixels in said adjacent lower level;

(f) replacing the base level of said pyramid with said first array of pixels; and (g) starting at a level above said base level, at each pixel location that is not marked as an edge, filling the corresponding pixel locations in the adjacent lower level with the value of said pixel in said adjacent upper level until said first array at said base level is modified accordingly to provide an improved output image.

14. The invention of claim 13 wherein said predetermined number of associated pixels is four.

15. The invention of claim 13 wherein said predetermined function is an averaging function.

16. The invention of claim 13 wherein said step of starting at a level above said base level includes the step of starting at the top of said pyramid.

17. The invention of claim 13 further including the following steps:

(h) creating a first copy of an array at a given level;

(i) making a second copy of said array at a given level consisting only of data values at addresses corresponding to the location of edges in said array at a given level;

(j) filtering said first and second copies;

(k) at each corresponding location, replacing the original value in said array at a given level with the value in the filtered first copy if a pixel in the filtered second copy has a predetermined value.

18. The invention of claim 17 wherein said filtering step (j) includes the step of convolving the data values in each of said copies.

19. The invention of claim 18 wherein said convolving step includes the step of convolving with a 3×3 pixel mask.

20. The invention of claim 19 wherein said 3×3 mask has uniform weights.

21. The invention of claim 17 wherein said predetermined value in step (k) is zero.

22. The invention of claim 13 wherein the step (b) includes the step of processing the detections of a point target detector as an edge in the input image.

23. The invention of claim 13 including the step of averaging the output image with the input image.

24. An improved image processing technique including the steps of:

(a) creating a first array of pixels corresponding to an input image, each pixel having an address and a data value;

(b) creating a second array of data values at addresses corresponding to the location of edges in said image;

(c) setting said first array as a base level for a data pyramid;

(d) modifying said first array at said base level with said second array to create a modified base level in which each location is modified to contain an edge marker if an edge marker is present in a corresponding location of said second array, otherwise, each location contains data from said first array in a corresponding location;

(e) filling in the pyramid one level at a time, from the bottom to the top thereof, by creating additional arrays of data values, each additional array providing an additional level in said pyramid, each pixel in each level being either marked as an edge, if any of four pixels in the adjacent lower level is marked as an edge, or filled with a data value equal to the average of the values of said associated pixels in said adjacent lower level;

(f) replacing the base level of said pyramid with said first array of pixels; and (g) starting at starting at the top of said pyramid, at each pixel location that is not marked as an edge, filling the corresponding pixel locations in the adjacent lower level with the value of said pixel in said adjacent upper level until said first array at said base level is modified accordingly to provide an improved output image.

25. The invention of claim 24 further including the following steps:

(h) creating a first copy of an array at a given level;

(i) making a second copy of said array at a given level consisting only of data values at addresses corresponding to the location of edges in said array at a given level;

(j) filtering said first and second copies;

(k) at each corresponding location, replacing the original value in said array at a given level with the value in the filtered first copy if a pixel in the filtered second copy has a predetermined value.

26. The invention of claim 25 wherein said filtering step (j) includes the step of convolving the data values in each of said copies.

27. The invention of claim 26 wherein said convolving step includes the step of convolving with a 3×3 pixel mask.

28. The invention of claim 27 wherein said 3×3 mask has uniform weights.

29. The invention of claim 25 wherein said predetermined value in step (k) is zero.

30. The invention of claim 24 wherein the step (b) includes the step of processing the detections of a point target detector as an edge in the input image.

31. The invention of claim 24 including the step of averaging the output image with the input image.

* * * * *